United States Patent [19]

Ohkubo et al.

[11] Patent Number: 5,851,628
[45] Date of Patent: Dec. 22, 1998

[54] MAGNETIC RECORDING MEDIUM AND METHOD FOR MANUFACTURING THE SAME

[75] Inventors: Keiji Ohkubo; Naoki Takizawa, both of Nagano, Japan

[73] Assignee: Fuji Electric Co., Ltd., Japan

[21] Appl. No.: 821,455

[22] Filed: Mar. 21, 1997

[30] Foreign Application Priority Data

Mar. 21, 1996 [JP] Japan ................................ 8-063963

[51] Int. Cl.$^6$ ............................................. G11B 5/66
[52] U.S. Cl. .................. 428/141; 428/336; 428/694 T;
428/694 TS; 428/694 TR; 428/697 ST;
428/694 SG; 428/900
[58] Field of Search ............................ 428/694 T, 694 TS,
428/900, 1, 336, 141, 694 TR, 694 ST,
694 SG

[56] References Cited

U.S. PATENT DOCUMENTS

| | | | |
|---|---|---|---|
| 5,316,631 | 5/1994 | Ando | 204/132.2 |
| 5,496,606 | 3/1996 | Mizukami | 428/65.3 |
| 5,605,733 | 2/1997 | Ishikawa | 428/65.3 |
| 5,650,237 | 7/1997 | Satoh | 428/611 |
| 5,700,593 | 12/1997 | Okumura | 428/694 TS |

FOREIGN PATENT DOCUMENTS 4-321919  11/1992  Japan .

OTHER PUBLICATIONS

"Effects of CR Intermediate Layers on CoCrPt Thin Film Media on NiAl Underlayers", Lee et al., IEEE Transactions on Magnetics, vol. 31, No. 6, Nov. 1995.

*Primary Examiner*—Leszek Kiliman
*Attorney, Agent, or Firm*—Rossi & Associates

[57] ABSTRACT

In a magnetic recording medium in which at least Cr or Cr-alloy base layer and Co-alloy magnetic layer are formed in this order on a substrate, a seed layer is provided between the substrate and the base layer. In a preferred embodiment, the seed layer is made of a material selected from Al—Co, Cu—Si, Ni—Ga, Cu—Be, Mn—V, Ni—Zn and Fe—V each having a specific composition. Where the substrate is formed of a glass material, the base layer and magnetic layer are formed by sputtering on the substrate while the substrate is kept at a temperature of 150° to 300° C. and a bias voltage of −300 to 0 V is applied to the substrate.

13 Claims, 14 Drawing Sheets

MAGNETIC RECORDING MEDIUM AND METHOD FOR MANUFACTURING THE SAME

FIELD OF THE INVENTION

The present invention relates to a magnetic recording medium, such as a hard disc, that is mounted in an external memory device of a computer, and in particular to such a magnetic recording medium in which a seed layer is provided between a substrate and a base layer, and a method for manufacturing the recording medium.

BACKGROUND OF THE INVENTION

Techniques for increasing the recording density of a magnetic recording medium for a computer have been considerably developed in recent years, and the magnetic recording medium with such a high recording density is required to provide a high coercive force (Hc), low noise, and reduced floating height (FH) of a magnetic head used with the medium. FIG. 28 is a cross sectional view showing the cross-sectional structure of a general magnetic recording medium known in the art. To produce this magnetic recording medium, a Ni—P plated layer 2 is formed on an Al—Mg alloy base 1, and the plated layer 2 is mirror-finished by machining and then formed with minute protrusions and recesses by texturing, to thus form a substrate. Thereafter, a Cr base layer 3, magnetic layer 4, protective layer 5 are successively formed on the substrate by sputtering, and the protective layer 5 is then coated with a lubrication layer 6. The magnetic layer 4 may consist of an alloy film having a CoCrTa system, for example.

The known magnetic recording medium using the CoCrTa alloy film as the magnetic layer 4 provides a low-noise medium, but its coercive force Hc has a limit up to 2200 Oe. Techniques for producing a magnetic recording medium having a recording density of 10 Gbit/in$^2$ are currently being developed so that such a recording medium becomes available by the year 2000. The recording medium is required to provide a coercive force Hc of 3000 Oe or higher so as to achieve such a high recording density.

For use in a portable notebook computer, the magnetic recording medium is also required to be a small-sized, thin plate that is highly resistant to shocks. To meet with such requirements, a magnetic recording medium using a glass substrate has been developed which satisfies required mechanical characteristics, such as smoothness, hardness and Young's modulus. Unlike the above-described magnetic recording medium using the Al-alloy substrate plated with Ni and P, the recording medium using the glass substrate is not subjected to mechanical texturing, and thus not provided with magnetic anisotropy in the circumferential direction, which makes it difficult for the medium to achieve a high coercive force.

To achieve a high coercive force as described above, it has been proposed to use, as a magnetic recording material, a high-coercive-force magnetic material having one of CoCrPt system, CoNiCrTa system and CoCrTaPt system which contain Pt or Ni as an element for increasing the magnetic anisotropy of the crystal structure. Even if such a high-coercive-force magnetic material is used with the NiP/Al substrate to provide a recording medium, it is difficult for this medium to achieve a high coercive force of 2800 Oe or higher when the Co magnetic layer is epitaxially grown on the currently available Cr base layer. The coercive force of the medium with the glass substrate also has a limit up to 2200 Oe.

The magnetic recording media using the above-indicated high-coercive-force materials, however, suffer from high noise compared to those using CoCrTa alloy, and are thus difficult to meet the requirement for high recording density in the future. In view of this, the magnetic layer needs to be formed from fine Co magnetic particles, so as to reduce the magnetization transition region (width of magnetic wall) between recording bits and thereby reduce the noise of the medium. To this end, the particle size of the Cr particles is reduced by reducing the thickness of the Cr base layer, so that fine or minute Co magnetic particles are epitaxially grown along the grain boundary of the Cr particles of the base layer.

It is therefore a first object of the present invention to provide a magnetic recording medium, using a high-coercive-force magnetic material (CoCrPt system, CoNiCrTa system, CoCrTaPt system) for its magnetic layer, which medium shows a high coercive force of 3000 Oe or greater, and is able to reduce its noise to a level that is equivalent to or lower than a low-noise medium having CoCrTa system. It is a second object of the invention to provide a magnetic recording medium, using such a high-coercive-force magnetic material as indicated above for its magnetic layer, which medium has a glass substrate, and shows a coercive force of 2400 Oe or higher, while reducing its noise to a level that is equivalent to or lower than a low-noise medium having CoCrTa system. It is a third object of the invention to provide a method for producing such a magnetic recording medium as described just above.

To achieve a high-coercive force of 3000 Oe or greater to accomplish the first object, there is provided a magnetic recording medium having a magnetic layer formed of a high-coercive force material, and a seed layer provided between a substrate and a base layer formed of Cr or Cr alloy. In this case, the substrate preferably consists of an aluminum-alloy substrate plated with Ni and P, and each of the base layer and seed layer preferably has a film thickness in a range of 50 Å to 1000 Å.

To accomplish the second object where a glass substrate is used, at least a base layer and a magnetic layer are formed by sputtering on the glass substrate while the substrate is held at a temperature of 150° to 300° C. and a bias voltage of –300 to 0 V is applied to the substrate.

The seed layer maybe formed of a material selected from Al—Co, Cu—Si, Ni—Ga, Cu—Be, Mn—V, Ni—Zn and Fe—V each having a specific composition or ratio of contents of the two elements. The use of one of these materials enhances the crystal orientation at (110) plane in the body-centered cubic crystals of Cr or Cr—X that form the base layer, and improves the crystal orientation at (100) plane that is parallel with the axis of easy magnetization of the Co magnetic layer epitaxially grown on the base layer. Consequently, the recording medium provides a considerably high coercive force.

Where a glass substrate is used as the substrate of the recording medium, the material of the seed layer may be either a single element selected from Cr, Mo, Ta, Ti, W, V, Zr, Cu, Al, Si, Ag and In, or an alloy containing at least one of these elements. In this case, gases are prevented from discharged from the substrate, and the corrosion resistance can be thus improved.

It is also preferable to form concentric grooves by texturing in the surface of the substrate, or form minute protrusions and recesses on the surface of either the seed layer or the base layer by irradiating the surface with a laser beam, or form an uneven layer with minute protrusions and recesses, between the seed layer and the base layer.

Where a desired coercive force Hc is obtained in the manner as described above, the film thickness of the base layer can be reduced. With the thickness of the base layer thus reduced, the magnetic layer formed on the base layer may be formed of fine Co magnetic particles, with a result of reduction in a magnetization transition region (width of magnetic wall) between recording bits, whereby the noise of the resulting medium can be reduced.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

First Embodiment

Figure 1:
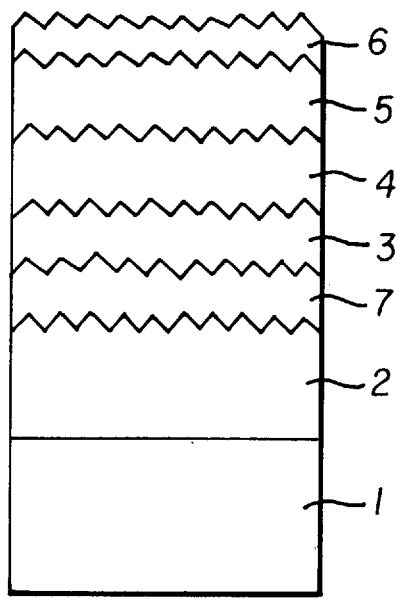
FIG. 1 is a cross sectional view showing the construction of a magnetic recording medium according to the first embodiment of the present invention.

There will be described the first embodiment of the present invention, referring to the accompanying drawings. FIG. 1 is a schematic view showing a cross-sectional structure of a magnetic recording medium constructed according to the present invention. To produce this magnetic recording medium, an Ni—P plated layer 2 is formed on a disc-like Al—Mg alloy base 1, and the plated layer 2 is mirror-finished by machining, and then formed with minute protrusions and recesses by texturing in the circumferential direction of the base, to thus form a substrate. Thereafter, a seed layer 7, Cr base layer 3, magnetic layer 4 and protective layer 5 are successively formed on the substrate by sputtering at a bias voltage of 250 V while the substrate is kept at 250° C. Finally, a lubrication layer 6 is applied by coating to the obtained layered structure. The texturing process is conducted onto the surface of the substrate so as to rectify the magnetic anisotropy of the magnetic layer formed thereon to thereby improve the coercive force Hc. At the same time, the minute protrusions and recesses formed on the substrate surface are reflected on the medium surface after the above layers 7, 3, 4, 5 and 6 are formed on the substrate, so as to reduce the friction between the medium surface and a magnetic head to be used with the recording medium.

The seed layer 7 used in the present embodiment is formed of a material selected from Al—Co, Cu—Si, Ni—Ga, Cu—Be, Mn—V, Ni—Zn and Fe—V.

Figure 2:
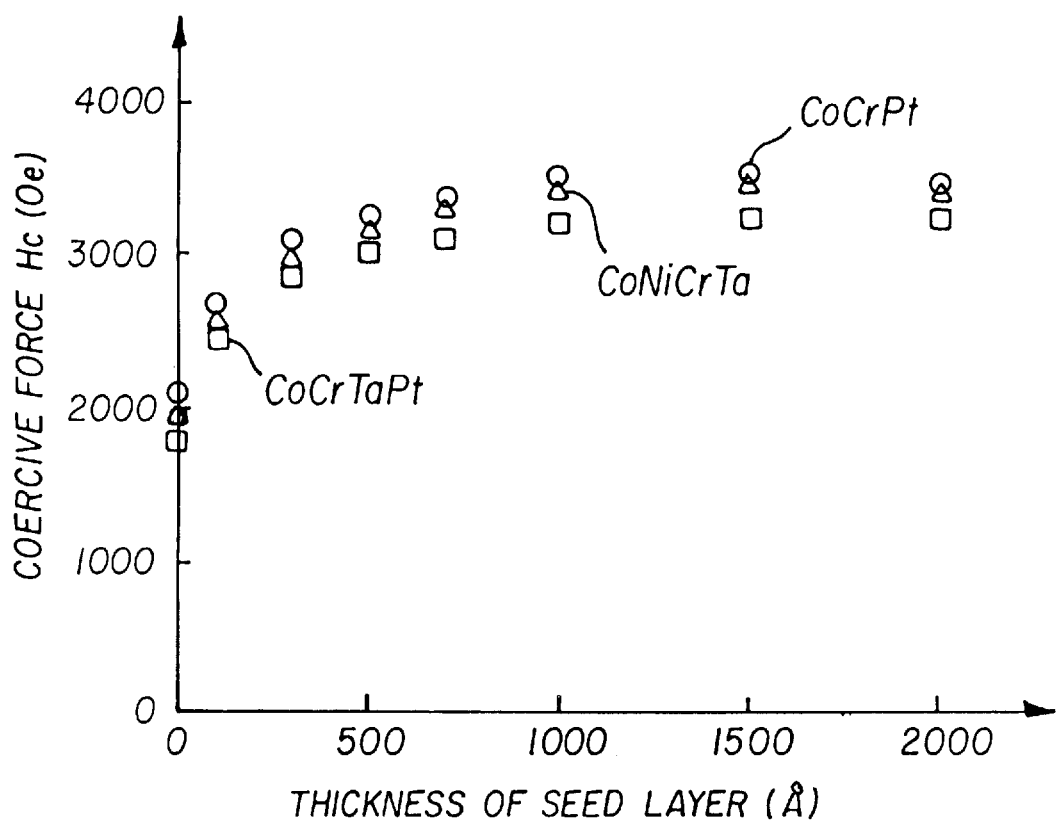
FIG. 2 is a graph showing the relationship between the film thickness of a seed layer and the coercive force of the magnetic recording medium of the first embodiment.

Some samples of magnetic recording media were prepared each having seed layer 7 formed of Al—Co (Al: 50 at %, Co: 50 at %), and Cr base layer 3 having a constant film thickness of 500 Å. The magnetic layers 4 of these samples were formed of magnetic materials having CoNiCrTa system (Ni: 25 at %, Cr: 10 at %, Ta: 2 at %), CoCrTaPt system (Cr: 11 at %, Ta: 4 at %, Pt: 3 at %), and CoCrPt system (Cr: 14 at %, Pt: 7 at %), respectively. FIG. 2 is a graph showing the dependence of the coercive force Hc of each recording medium on the film thickness of the seed layer 7. It will be understood from FIG. 2 that the recording medium achieves a coercive force of 3000 Oe of higher if its magnetic layer has the CoCrPt system and the thickness of the seed layer 7 is 300 Å or greater, or if the magnetic layer has the CoNiCrTa or CoCrTaPt system and the thickness of the seed layer 7 is 500 Å or greater.

Figure 3:
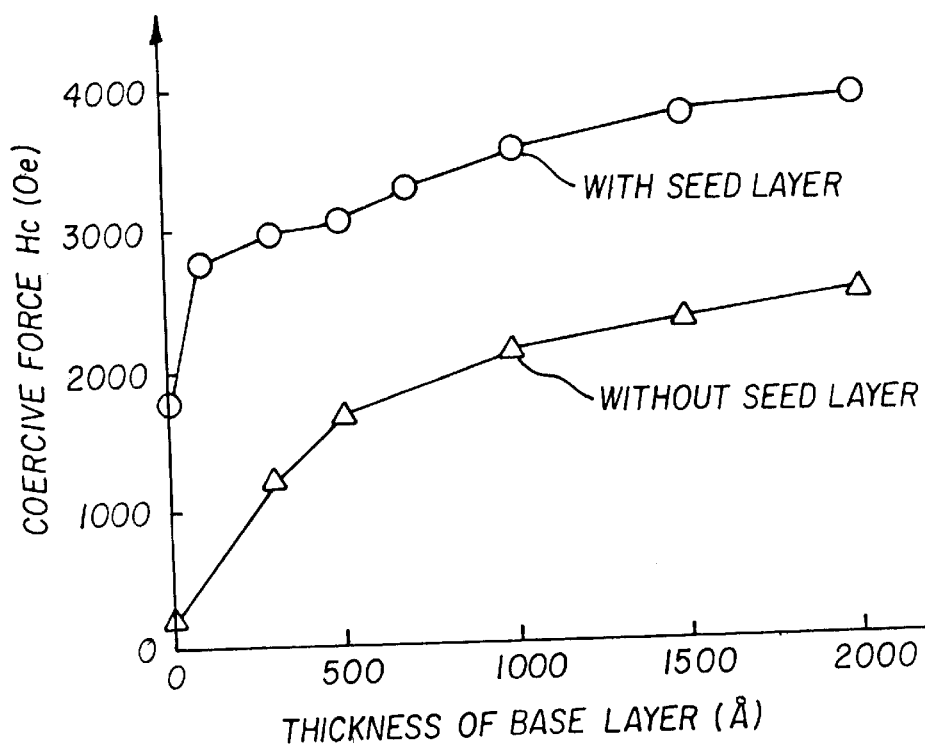
FIG. 3 is a graph showing the relationship between the film thickness of a base layer and the coercive force of the magnetic recording medium of the first embodiment.
Figure 4:
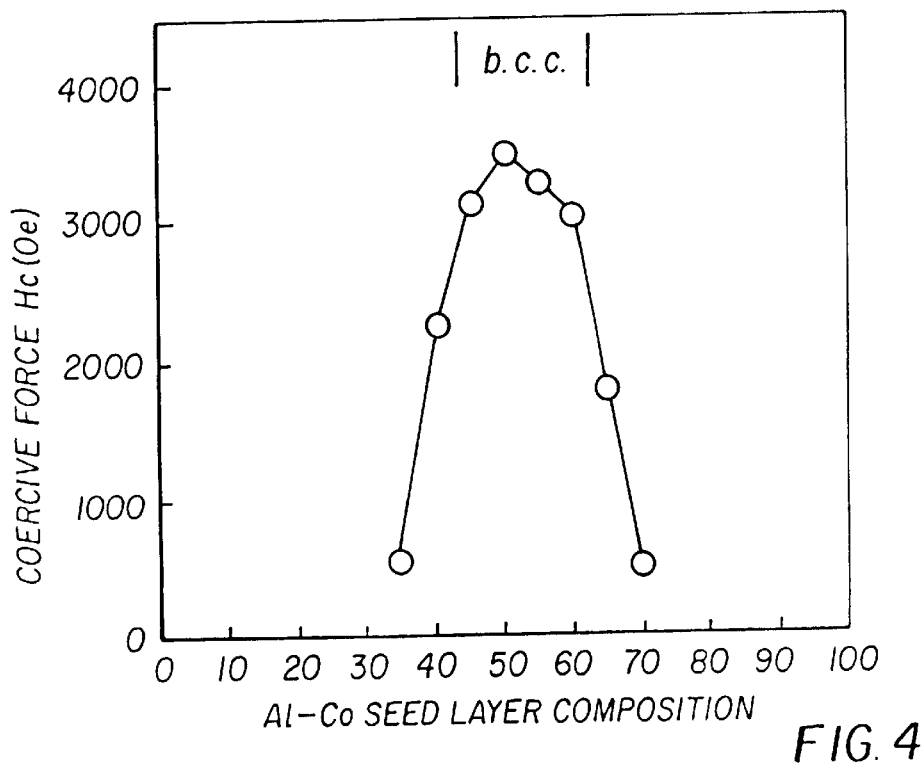
FIG. 4 is a graph showing the relationship between the composition of the material of the seed layer containing Al and Co and the coercive force of the magnetic recording medium of the first embodiment.
Figure 5:
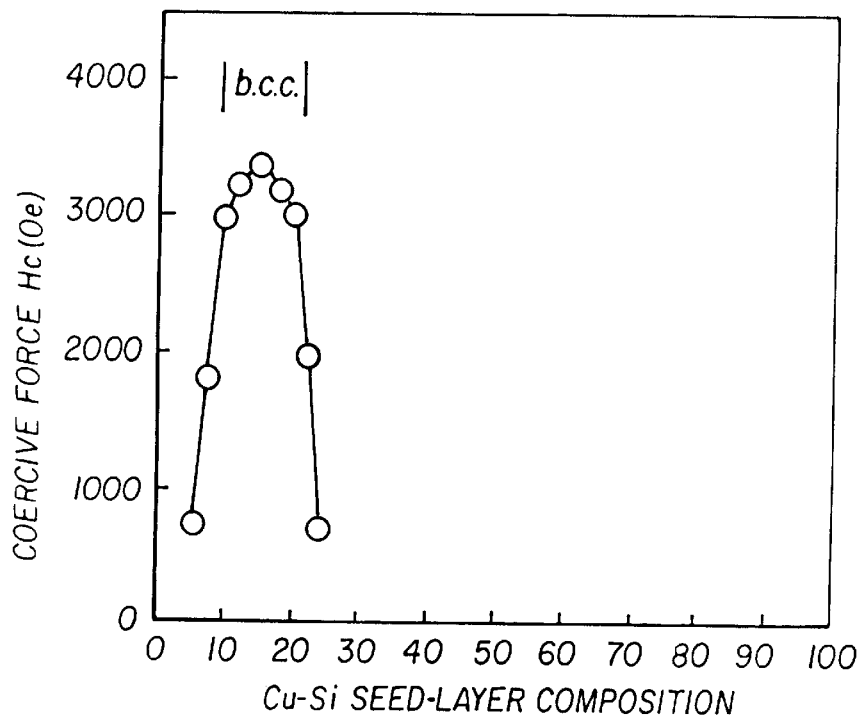
FIG. 5 is a graph showing the relationship between the composition of the seed-layer material containing Cu and Si and the coercive force of the magnetic recording medium of the first embodiment.
Figure 6:
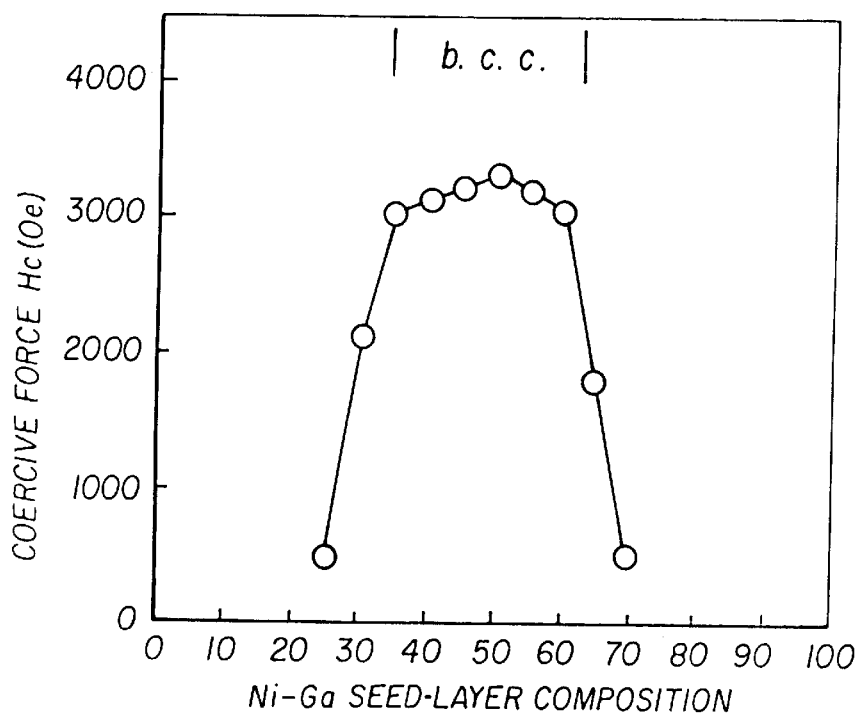
FIG. 6 is a graph showing the relationship between the composition of the seed-layer material containing Ni and Ga and the coercive force of the magnetic recording medium of the first embodiment.
Figure 7:
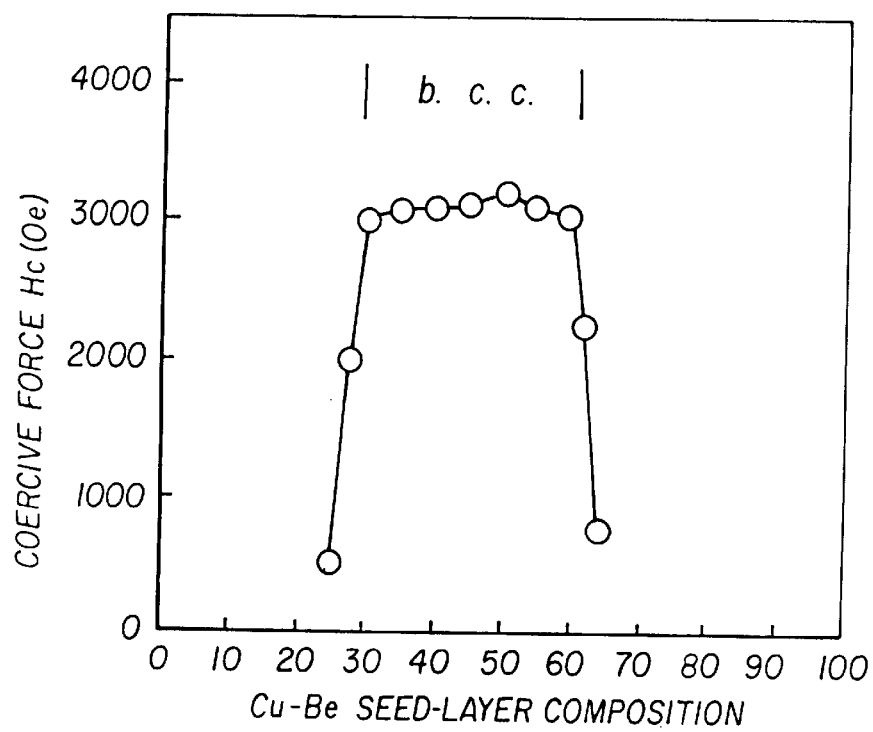
FIG. 7 is a graph showing the relationship between the composition of the seed-layer material containing Cu and Be and the coercive force of the magnetic recording medium of the first embodiment.
Figure 8:
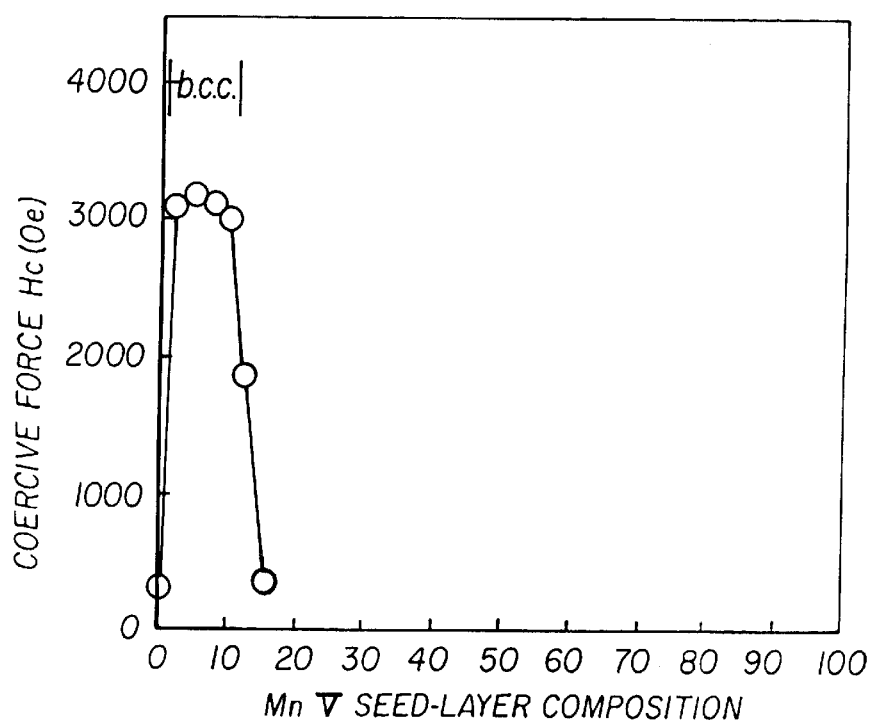
FIG. 8 is a graph showing the relationship between the composition of the seed-layer material containing Mn and V and the coercive force of the magnetic recording medium of the first embodiment.
Figure 9:
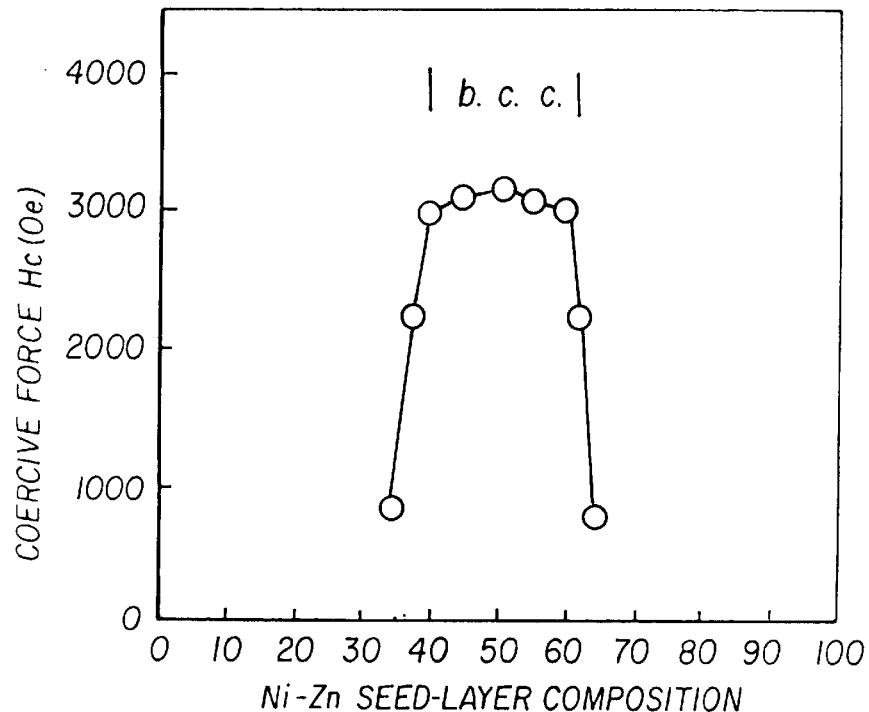
FIG. 9 is a graph showing the relationship between the composition of the seed-layer material containing Ni and Zn and the coercive force of the magnetic recording medium of the first embodiment.
Figure 10:
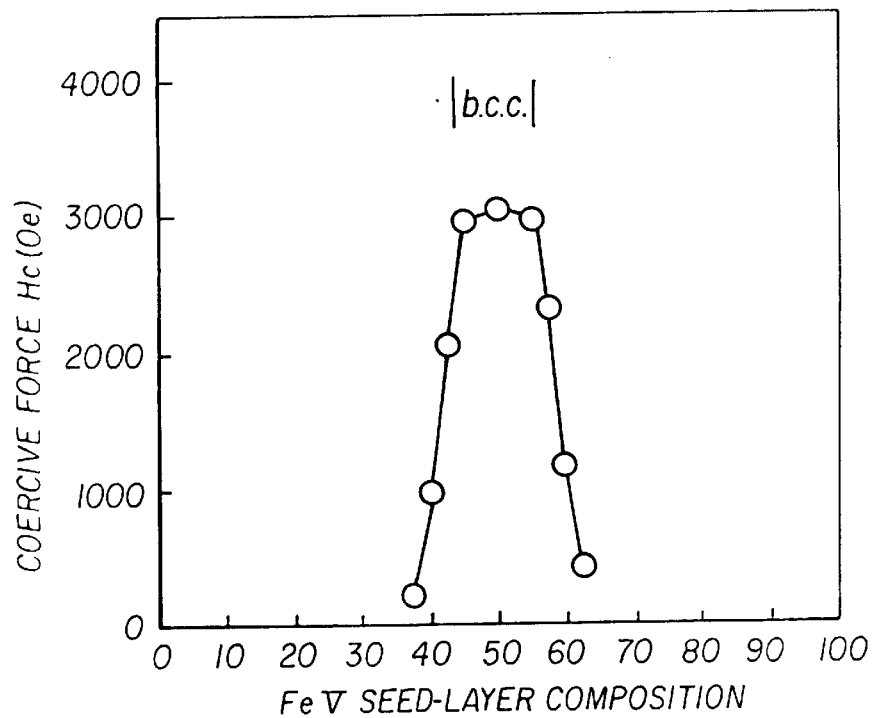
FIG. 10 is a graph showing the relationship between the composition of the seed-layer material containing Fe and V and the coercive force of the magnetic recording medium of the first embodiment.

In another experiment, a recording medium provided with a 500 Å seed layer 7 formed of Al and Co (Al: 50 at %, Co: 50 at %) and a recording medium having no seed layer 7 were prepared in both of which its magnetic layer 4 is formed of a magnetic material having CoCrTaPt system. The graph of FIG. 3 shows the dependence of the coercive force Hc of each sample on the film thickness of its Cr base layer 3. The coercive force Hc of the magnetic recording medium having the 500 Å-thickness seed layer 7 was found higher about 1500 Oe than the medium having no seed layer 7, irrespective of the thickness of the Cr base layer. It is to be noted in FIG. 3 that the magnetic recording medium with the seed layer 7 achieves a considerably high coercive force of 3000 Oe or greater when the thickness of its Cr base layer is 500 Å or larger.

With respect to samples of magnetic recording media in which the magnetic layer 4 was formed of a magnetic material having CoCrTaPt system, and the Cr base layer 3 had a constant film thickness of 500 Å, the relationship between the composition of the material of the seed layer 7 and the coercive force Hc of each sample is shown in the graphs of FIG. 4 through FIG. 10 where the seed layers 7 of the respective samples are formed of Al and Co, Cu and Si, Ni and Ga, Cu and Be, Mn and V, Ni and Zn, and Fe and V. To improve the coercive force, there is a need to improve the crystal orientation of body-centered cubic crystals (bcc) that provide the crystal structure of the Cr or Cr—X (X: Mo, Ta, Ti, W) base layer 3 that accelerates epitaxial growth of the Co-alloy magnetic layer 4 formed thereon. TABLE 1 below show the composition regions or ranges of the respective seed-layer materials that can provide the same bcc crystal structure.

TABLE 1

| Material of Seed Layer | Range of X for Obtaining bcc Structure |
| --- | --- |
| $Al_{1-X}$—$Co_X$ | $0.45 \leq X \leq 0.65$ |
| $Cu_{1-X}$—$Si_X$ | $0.10 \leq X \leq 0.20$ |
| $Ni_{1-X}$—$Ga_X$ | $0.35 \leq X \leq 0.60$ |
| $Cu_{1-X}$—$Be_X$ | $0.30 \leq X \leq 0.60$ |
| $Mn_{1-X}$—$V_X$ | $0.01 \leq X \leq 0.10$ |
| $Ni_{1-X}$—$Zn_X$ | $0.40 \leq X \leq 0.60$ |
| $Fe_{1-X}$—$CV_X$ | $045 \leq X \leq 0.55$ |

Where the compositions of the respective seed-layer materials are within the above-indicated ranges, a high coercive force Hc of 3000 Oe or greater can be obtained. The compositions that are outside the above ranges provide metal compounds having a different crystal system than the bcc crystal structure, and the coercive force Hc is thus lowered.

Figure 11:
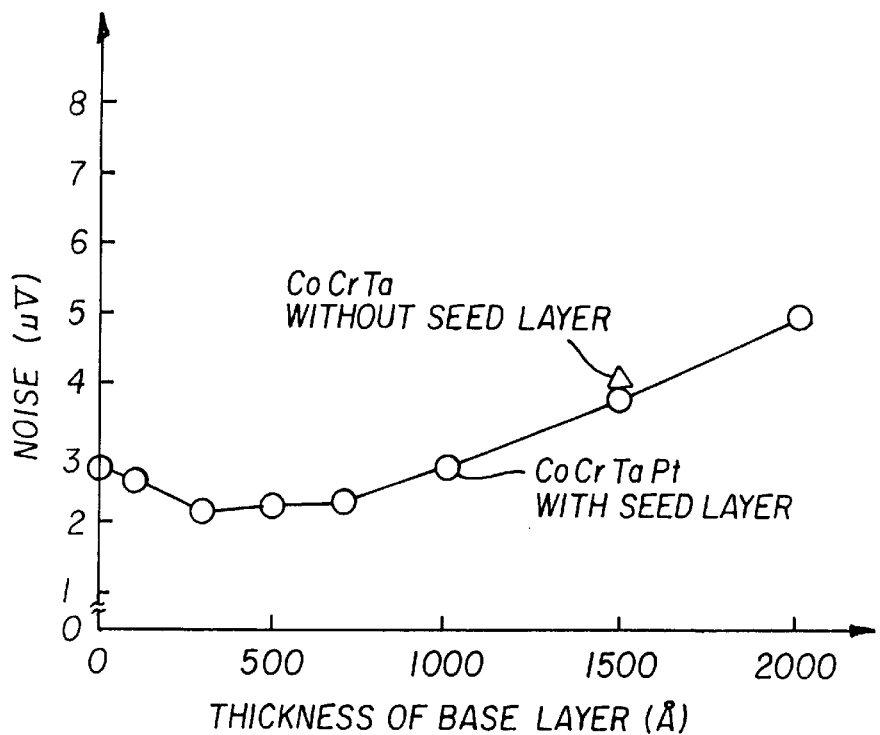
FIG. 11 is a graph showing the relationship between the film thickness of the base layer and the noise of the magnetic recording medium of the second embodiment of the invention.

With respect to a magnetic recording medium including a magnetic layer 4 formed of a magnetic material having CoCrTaPt system, and a 500 Å-thickness seed layer 7 formed of Al and Co (Al: 50 at %, Co: 50 at %), and having a coercive force of 2400 Oe, Brδ of 100 G$\mu$m and linear recording density of 150 kFCI, the dependence of noise as a recording/reproducing characteristic of the medium on the film thickness of its base layer was observed, and the result is shown in FIG. 11. The recording medium including the 500 Å-thickness seed layer 7 according to the present invention shows an excellent noise characteristic ($\leq 3 \mu V$) where the noise is equivalent or lower than that of a CoCrTa medium (having no seed layer 7) that uses a low-noise magnetic materia (CoCrTa).

Figure 12:
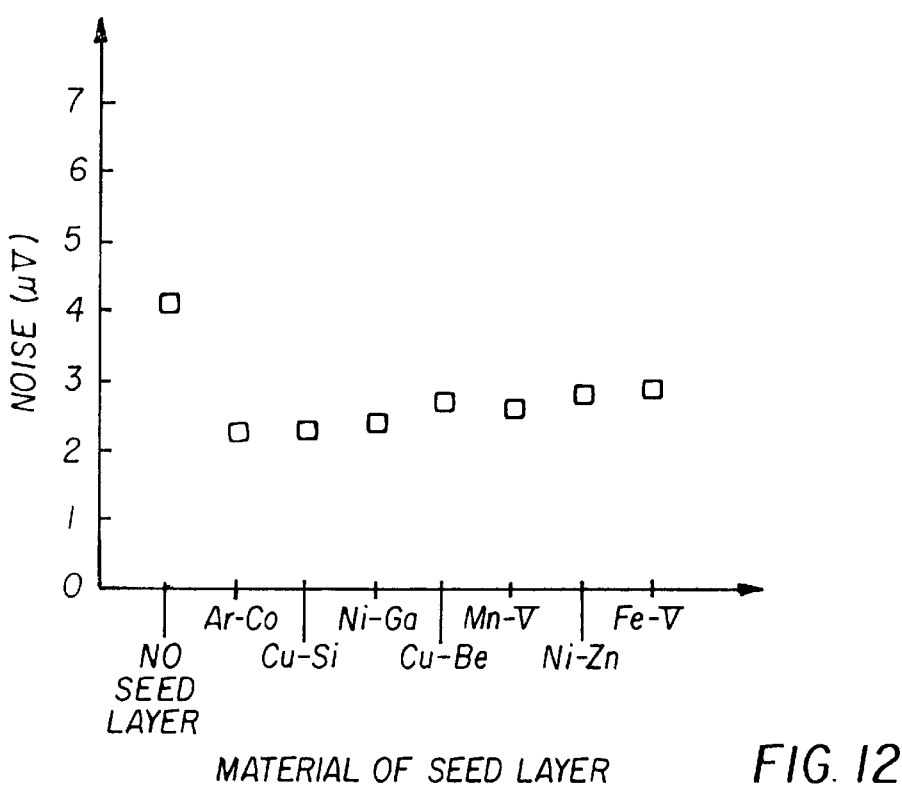
FIG. 12 is a graph showing the relationship between the material for the seed layer and the noise of the magnetic recording medium of the second embodiment.

The graph of FIG. 12 shows the noise as a recording/reproducing characteristic of samples of magnetic recording media each having a magnetic layer 4 formed of a magnetic material of CoCrTaPt system and a 500 Å-thickness seed layer 7, with seed layers of the respective samples formed of Al—Co, Cu—Si, Ni—Ga, Mn—V, Ni—Zn and Fe—V. This graph also shows the noise of a comparative sample having no seed layer 7. Each of these samples had a coercive force of 2400 Oe, Brδ of 100 G$\mu$m and linear recording density of 150 kFCI. It will be understood from FIG. 12 that the recording medium having the seed layer 7 made of any of the above materials exhibits an excellent noise characteristic. Namely, according to the present invention, the provision of the seed layer 7 not only successfully achieve desired magnetic characteristics of the medium, but also allows the film thickness of the base layer 3 to be reduced, which leads to reduction of the noise. Although actual recording/reproducing characteristics cannot be confirmed since currently available magnetic heads are not able to satisfactorily perform recording on a medium having a coercive force of 2500 Oe or higher, the superiority or advantage of the recording medium of the present invention, even where the medium has a high linear recording density of 200 kFCI or greater, can be easily gathered from the result of the experiments conducted on the present embodiment.

Second Embodiment

Figure 13:
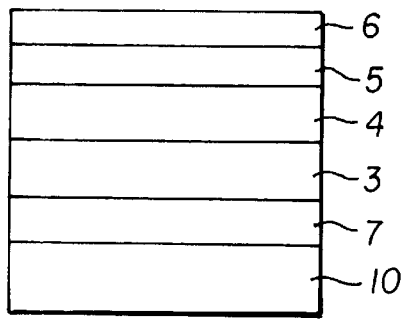
FIG. 13 is a cross sectional view showing the construction of one example of the recording magnetic medium of the second embodiment which has no minute protrusions and recesses.
Figure 14:
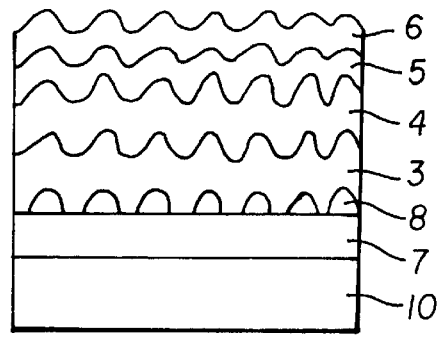
FIG. 14 is a cross sectional view showing the construction of another example of the recording magnetic medium of the second embodiment which is provided with an uneven layer with minute protrusions and recesses.
Figure 15A:
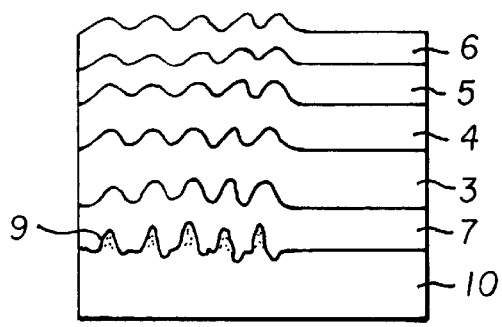
FIG. 15(a) is a cross sectional view showing the construction of a further example of the recording magnetic medium of the second embodiment in which minute protrusions and recesses are formed on the glass substrate.
Figure 15B:
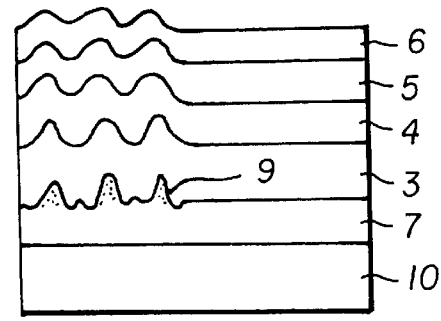
FIG. 15(b) is a cross sectional view showing the construction of a still further example of the magnetic recording medium of the second embodiment in which minute protrusions and recesses are formed on the seed layer.

FIGS. 13, 14, 15(a) and 15(b) are cross sectional views showing examples of magnetic recording media according to the second embodiment of the present invention, wherein seed layer 7, base layer 3, magnetic layer 4 and protective layer 5 are successively formed by sputtering on a glass substrate 10, and a lubrication layer 6 is finally applied by coating onto the obtained layered structure. The substrate 10 is kept at a temperature of 150° to 250° C. while the seed layer 7, base layer 3, magnetic layer 4 and protective layer 5 are formed by sputtering, and a bias voltage of −300 to 0 V is applied while the base layer 3 and magnetic layer 4 are formed by sputtering. The film thickness of the seed layer 7 is controlled to be within a range of 50 Å to 1000 Å, and the film thickness of the base layer 3 may be reduced to within a range of 50 Å to 1000 Å. The recording medium of FIG. 14 has an uneven layer 8 with minute protrusions and recesses, which is formed by sputtering between the seed layer 7 and the base layer 3 over the entire surfaces thereof. The cross sectional views of FIGS. 15(a) and 15(b) shows recording media produced by irradiating a surface of the glass substrate 10 or a metal thin film of the seed layer 7 with a laser beam, and fusing the glass or metal thin film so as to form minute protrusions and recesses 9 in a spiral or concentric pattern in a radially inner region of the disc that provides a CSS region. The uneven layer 8 of the recording medium of FIG. 14 is not limited to an $Al_2O_3$ layer, but may be formed of a nitride or oxide of Al, Ta, Ti, Si, B, Zr or Cr, for example.

Figure 16:
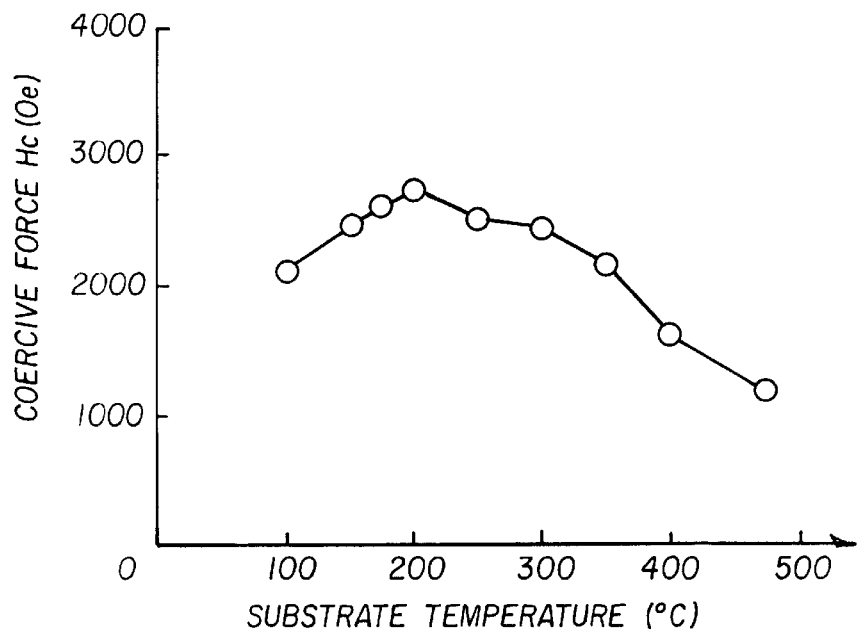
FIG. 16 is a graph showing the relationship between the temperature of the substrate during film formation by sputtering and the coercive force of the magnetic recording medium of the second embodiment.

The graph of FIG. 16 shows the relationship between the temperature of the substrate measured when Cr seed layer 7 and Cr base layer 3 both having a thickness of 300 Å and CoCrTaPt (Cr: 11 at %, Ta: 4 at %, Pt: 3 at %) magnetic layer 4 having a thickness of 150 Å were formed by sputtering on the substrate, and the coercive force Hc of the resulting recording medium. It will be understood from FIG. 16 that a coercive force Hc of 2400 Oe or higher can be obtained when the temperature of the substrate is within a range of 150° to 300° C. In the following experiments, the substrate was kept at 200° C. during the sputtering step.

Figure 17:
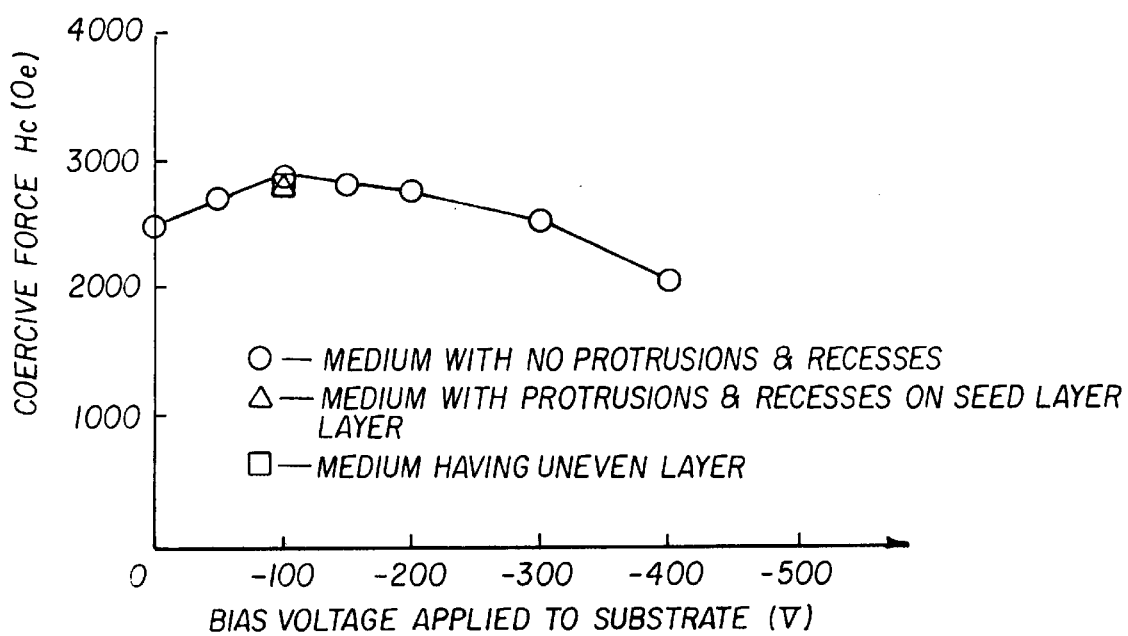
FIG. 17 is a graph showing the bias voltage applied to the substrate during film formation by sputtering and the coercive force of the magnetic recording medium of the second embodiment.

The graph of FIG. 17 shows the relationship between the bias voltage measured when Cr seed layer 7 and Cr base layer 3 both having a thickness of 300 Å and CoCrTaPt (Cr: 11 at %, Ta: 4 at %, Pt: 3 at %) magnetic layer 4 having a thickness of 150 Å were formed by sputtering on the substrate, and the coercive force Hc of the resulting recording medium. It will be understood from FIG. 17 that a coercive force Hc of 2400 Oe or higher can be obtained when the bias voltage applied to the substrate is in a range of −300 to 0 V. In the graph of FIG. 17, "○" indicates a medium (as shown in FIG. 13) having no protrusions and recesses, "□" indicates a medium (as shown in FIG. 14) having an uneven layer with minute protrusions and recesses between the seed layer 7 and the base layer 3, and "Δ" indicates a medium (as shown in FIG. 15(b)) in which protrusions and recesses were formed in the seed layer 7 with a laser beam. When a bias voltage of −100 V was applied to the substrate while the above layers 7, 3, 4 were formed on the substrate, the obtained recording media of the above three examples provided almost equivalent coercive forces, specifically, 2870 Oe, 2830 Oe and 2850 Oe, respectively. In the following experiments, the bias voltage of −100 V was applied to the substrate when the above layers 7, 3, 4 were formed on the substrate.

Figure 18:
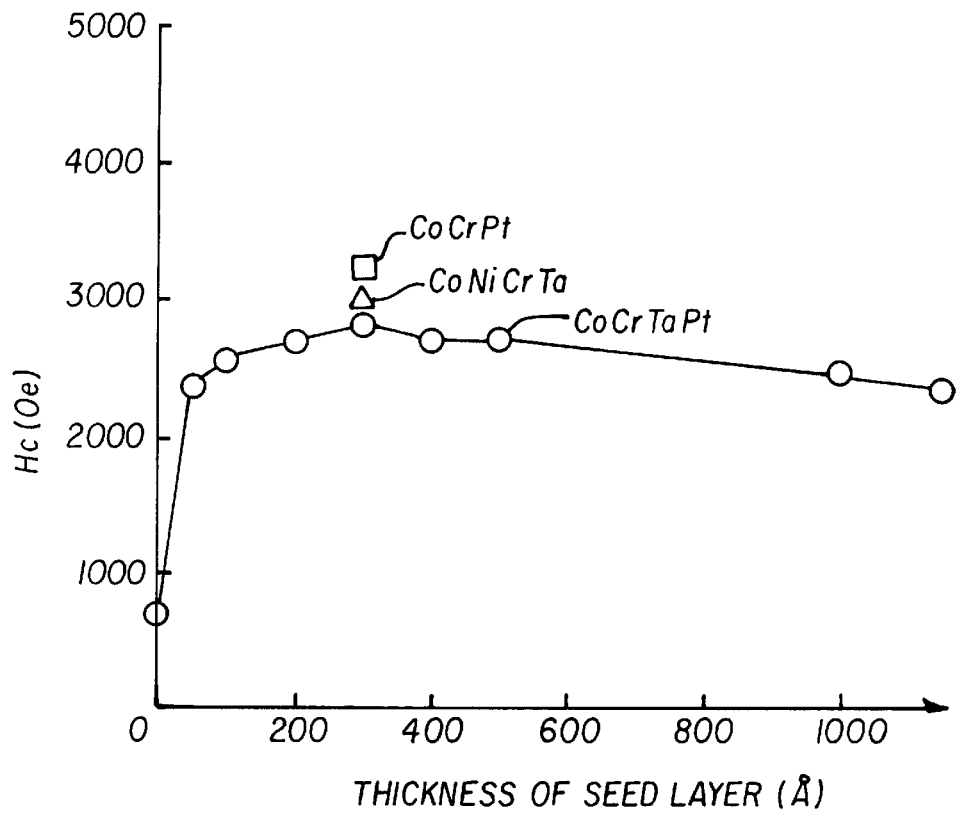
FIG. 18 is a graph showing the film thickness of the Cr seed layer and the coercive force of the magnetic recording medium of the second embodiment.

The graph of FIG. 18 shows the dependence of the coercive force of a recording medium having a 300 Å-thickness Cr base layer 3 and a 150 Å-thickness CoCrTaPt (Cr: 11 at %, Ta: 4 at %, Pt: 3 at %) magnetic layer 4 on the film thickness of its Cr seed layer. This graph also shows the same relationship with respect to recording media having magnetic layers 4 made of magnetic materials of CoNiCrTa system (Ni: 25 at %, Cr: 10 at %, Ta: 2 at %) and CoCrPt system (Cr: 14 at %, Pt: 7 at %), respectively. It will be understood from FIG. 18 that a coercive force of 2400 Oe or higher can be obtained where the film thickness of the seed layer 7 is 50 Å or greater.

Figure 19:
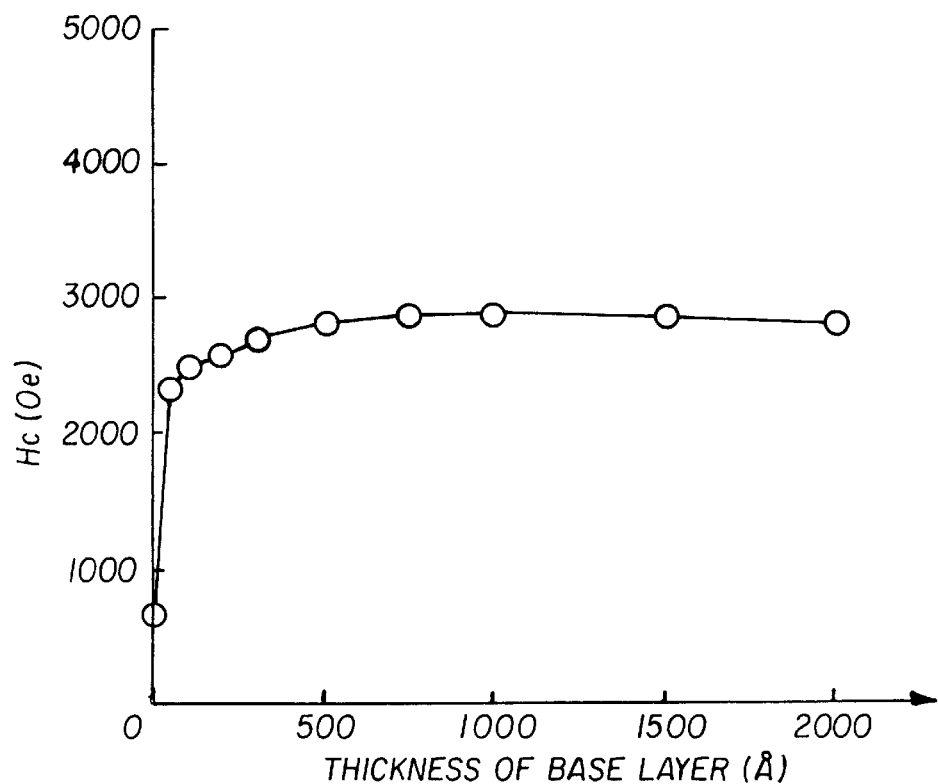
FIG. 19 is a graph showing the relationship between the film thickness of the Cr base layer and the coercive force of the magnetic recording medium of the second embodiment.
Figure 20:
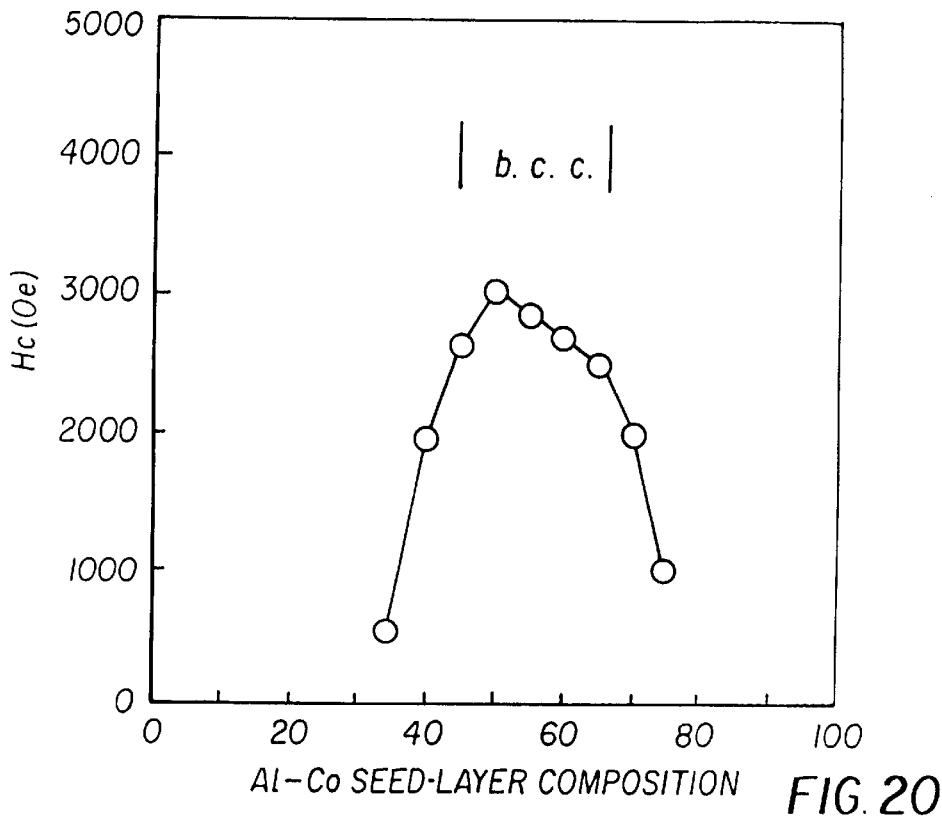
FIG. 20 is a graph showing the relationship between the composition of the seed-layer material containing Al and Co and the coercive force of the magnetic recording medium of the second embodiment.
Figure 21:
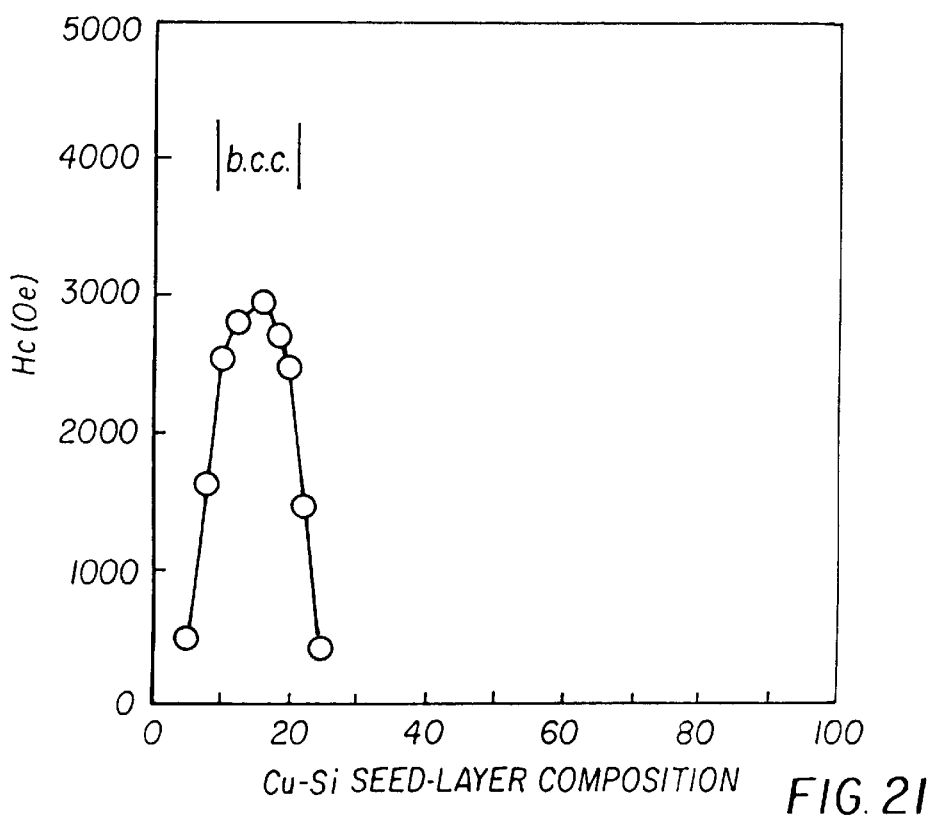
FIG. 21 is a graph showing the relationship between the composition of the seed-layer material containing Cu and Si and the coercive force of the magnetic recording medium of the second embodiment.
Figure 22:
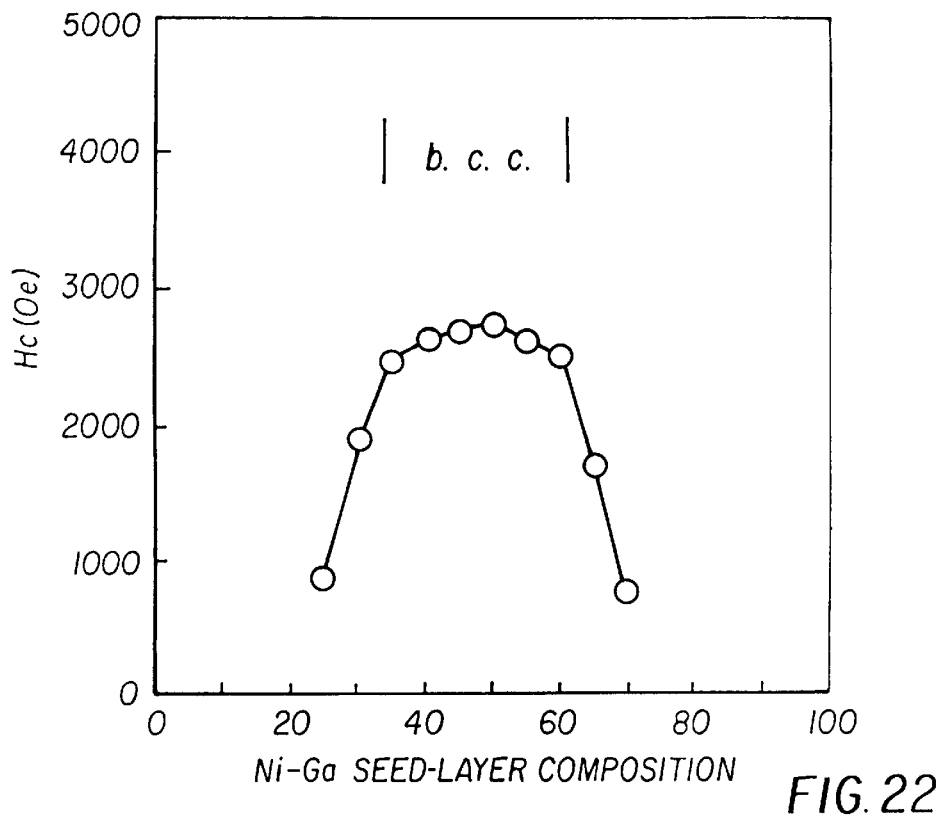
FIG. 22 is a graph showing the relationship between the composition of the seed-layer material containing Ni and Ga and the coercive force of the magnetic recording medium of the second embodiment.
Figure 23:
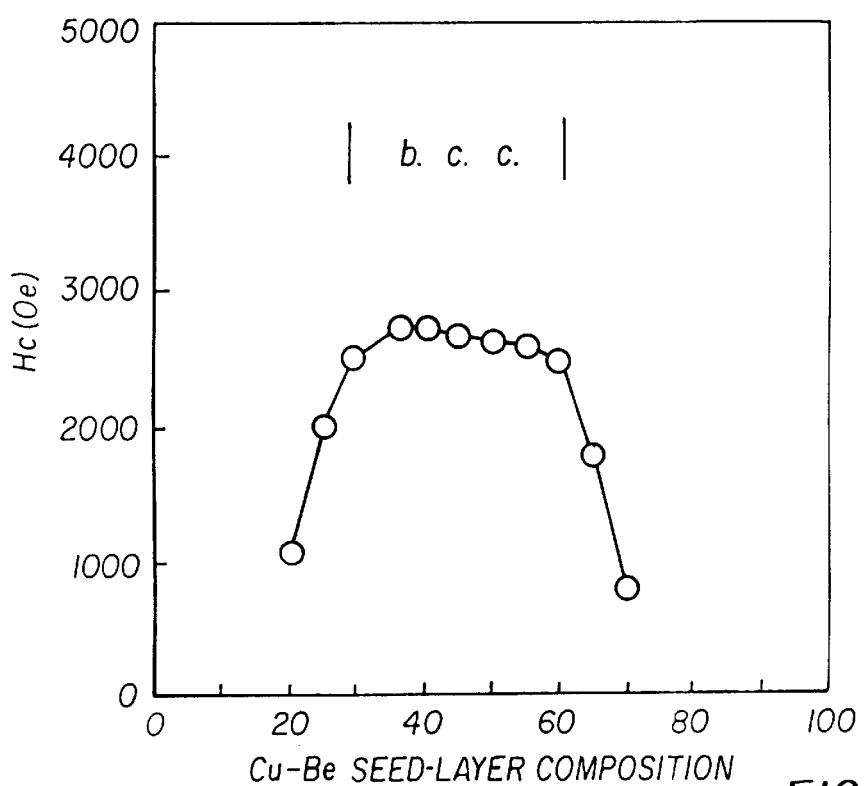
FIG. 23 is a graph showing the relationship between the composition of the seed-layer material containing Cu and Be and the coercive force of the magnetic recording medium of the second embodiment.
Figure 24:
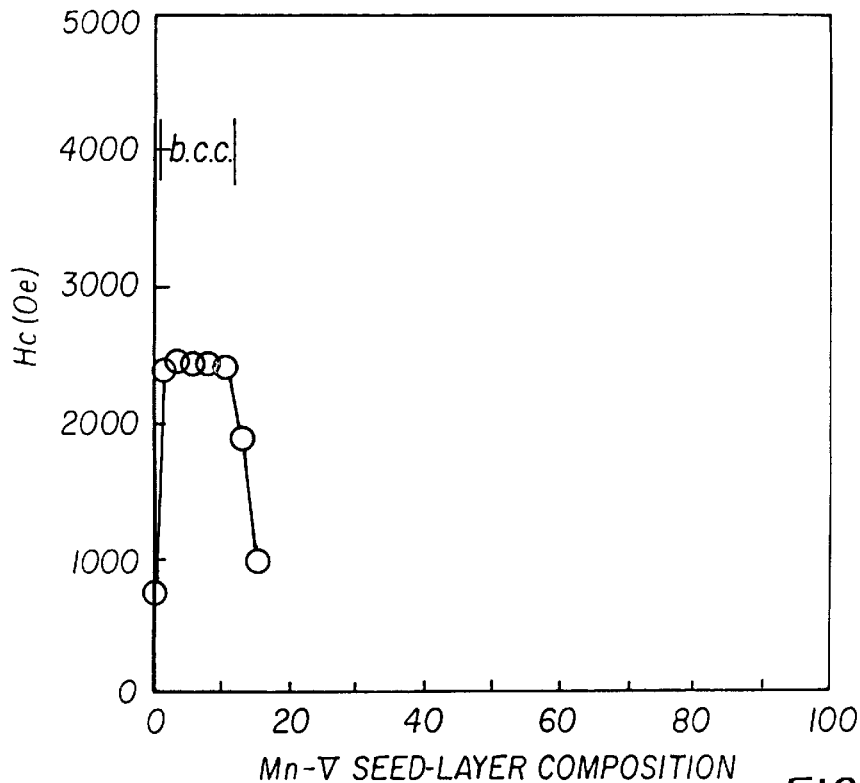
FIG. 24 is a graph showing the relationship between the composition of the seed-layer material containing Mn and V and the coercive force of the magnetic recording medium of the second embodiment.
Figure 25:
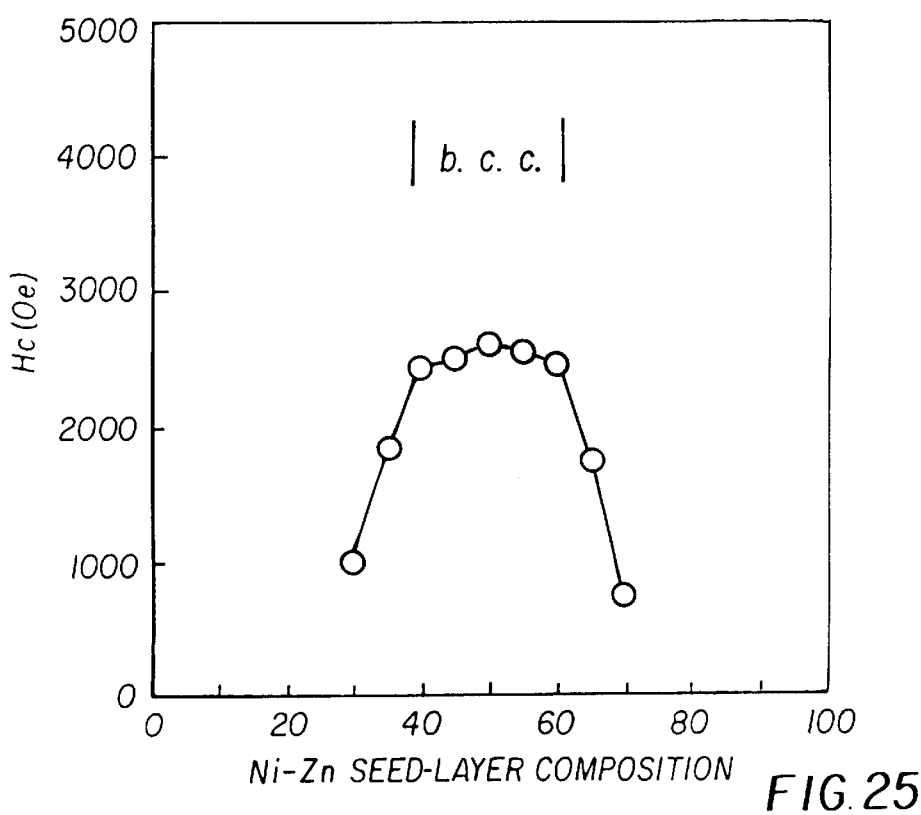
FIG. 25 is a graph showing the relationship between the composition of the seed-layer material containing Ni and Zn and the coercive force of the magnetic recording medium of the second embodiment.
Figure 26:
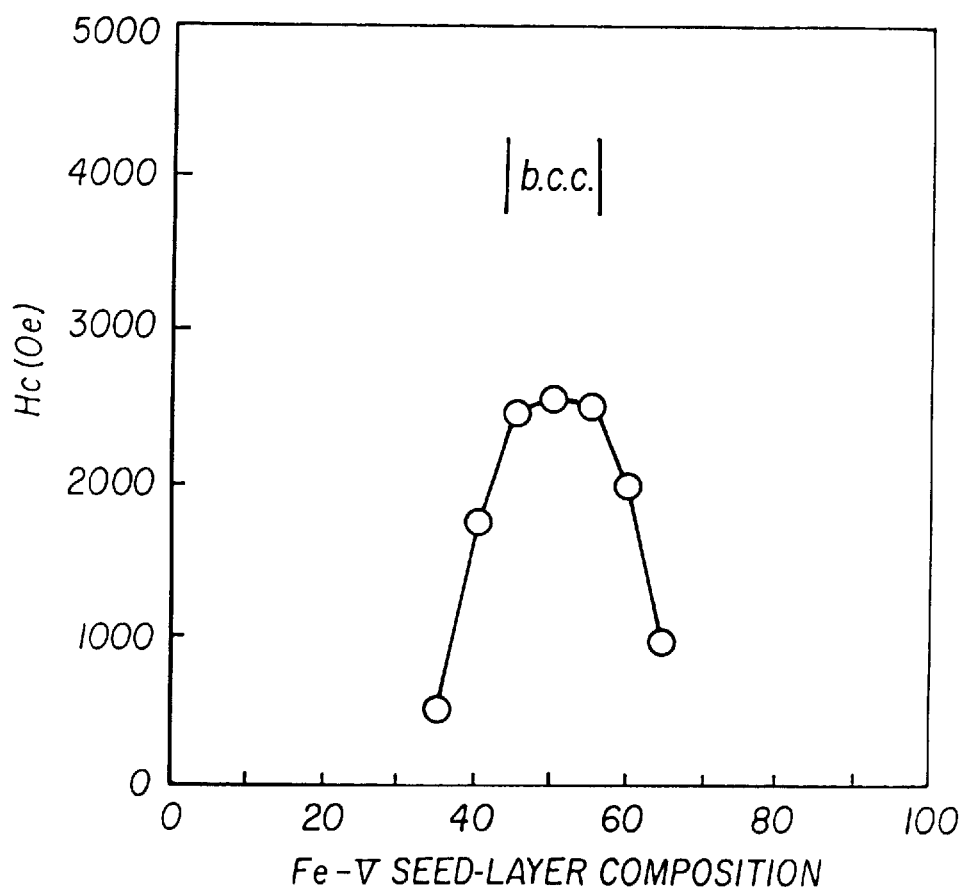
FIG. 26 is a graph showing the relationship between the composition of the seed-layer material containing Fe and V and the coercive force of the magnetic recording medium of the second embodiment.

The graph of FIG. 19 shows the dependence of the coercive force of a recording medium having a 300 Å-thickness Cr seed layer 7 and a 150 Å-thickness CoCrTaPt (Cr: 11 at %, Ta: 4 at %, Pt: 3 at %) magnetic layer 4 on the film thickness of its Cr base layer. It will be understood from FIG. 19 that a coercive force of 2400 Oe or higher can be obtained where the film thickness of the base layer 3 is 50 Å or greater.

In the above experiments, the seed layer 7 and base layer 3 were formed as Cr layers each having a thickness of 300 Å. In this case, the Cr seed layer 7 is initially formed by sputtering, and, after completion of this sputtering step, another Cr layer is formed as the base layer on the surface of the seed layer 7 by sputtering. Immediately following these sputtering steps, the magnetic layer is formed by sputtering. Since the Co alloy that forms the magnetic layer grows along the grain boundary of the Cr base layer formed by sputtering immediately before the formation of the magnetic layer, the size of magnetic particles of the Co Alloy depends solely on the particle size of the Cr base layer. Accordingly, the magnetic layer that is epitaxially grown on the Cr base layer can be formed of fine or minute particles by reducing the film thickness of the Cr base layer and reducing the particle size of the Cr base layer, so as to assure reduced noise of the resulting recoding medium. The seed layer 7 may be formed of a material selected from single elements, such as Mo, Ta, Ti, W, V, Zr, Cu, Al, Si, Ag and In, and alloys including at least one of these elements, and the base layer 3 may be formed of a material selected from Cr—X (X: Mo, Ta, Ti, W) alloys, so as to achieve a coercive force as high as or higher than that of the recording medium having the Cr seed layer and Cr base layer as described above. The seed layer formed of one of the above-indicated materials can prevent discharge of gas from the substrate, thus assuring improved corrosion resistance. With the results shown in FIG. 18 and 19 confirming that a sufficiently high coercive force can be achieved when both of the base layer and seed layer have a thickness in the range of 50 to 1000 Å, the thickness of these layers may be reduced as desired down to the lower limit of 50 Å.

Instead of using a single element selected from Cr, Mo, Ta, Ti, W, V, Zr, Cu, Al, Si, Ag and In as listed above or an alloy containing at least one of these elements for forming the seed layer, the seed layer may be formed of any of the materials indicated in TABLE 1 and used in the first embodiment, so as to improve the crystal orientation of the base layer as in the first embodiment, thereby to improve the crystal orientation of the Co-alloy magnetic layer for achieving an even higher coercive force.

Some samples of recording media were prepared wherein the magnetic layer 4 of each sample was formed of a magnetic material having CoCrTaPt system (Cr: 11 at %, Ta: 4 at %. Pt: 3 at %), and the Cr base layer 3 had a film thickness of 300 Å. The seed layers 7 of these samples were formed of respective materials as indicated in TABLE 1, whose compositions were varied in steps. The graphs of FIG. 20 through FIG. 26 show the relationship between the composition of each material of the seed layer 7 and the coercive force Hc of the resulting recording medium. It will be understood from these graphs that the coercive force Hc becomes 2400 Oe or higher if the composition is in such a range that provides a bcc crystal structure in the material of the seed layer (refer to TABLE 1), as in the first embodiment, and the coercive force Hc is reduced if the composition is outside the range and provides a metal compound whose crystal system is different from the bcc crystal structure.

Figure 27:
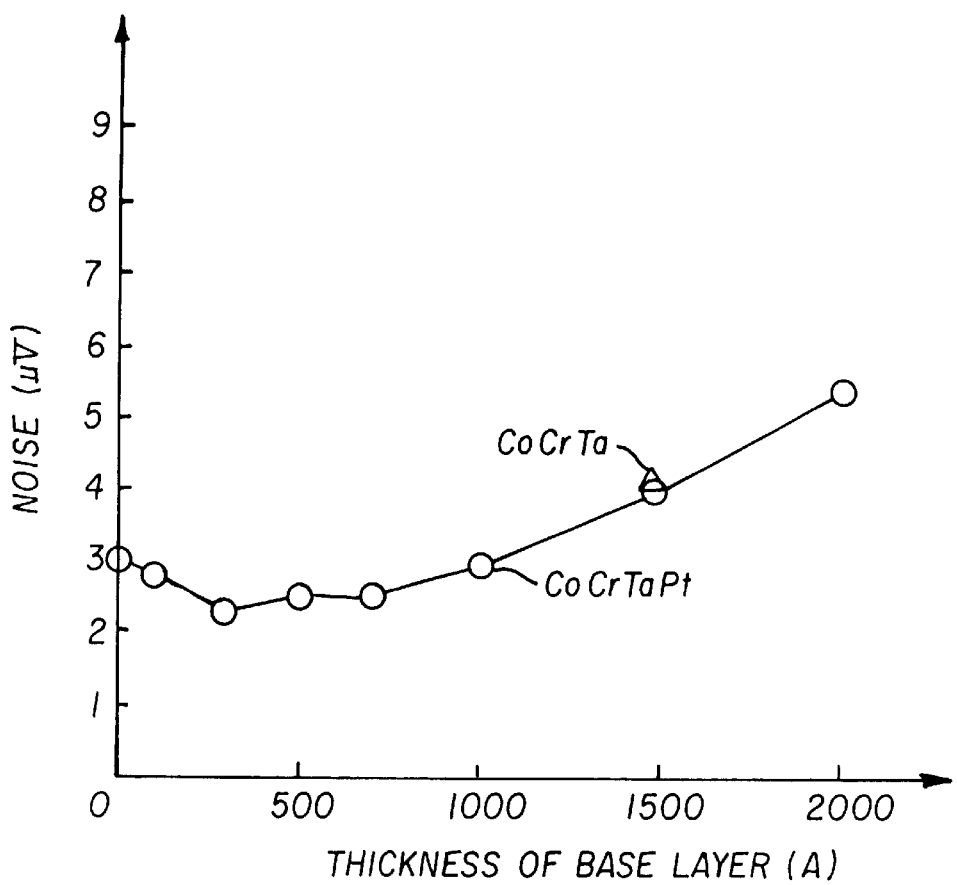
FIG. 27 is a graph showing the relationship between the film thickness of the Cr base layer and the noise of the magnetic recording medium of the second embodiment.
Figure 28:
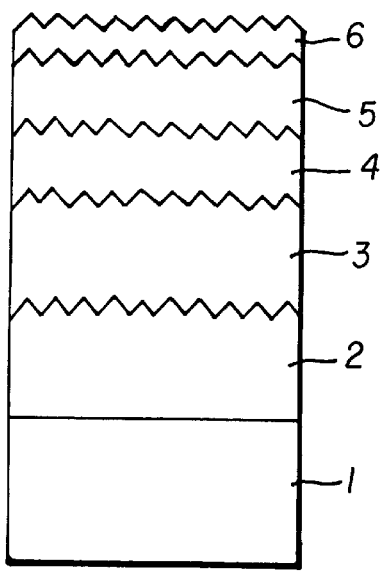
FIG. 28 is a cross sectional view showing the construction of a known magnetic recording medium.

With respect to a recording medium including a magnetic layer 4 made of a magnetic material of CoCrTaPt system (Cr: 11 at %, Ta: 4 at %, Pt: 3 at %) and a 300 Å-thickness seed layer 7 made of Al and Co (Al: 50 at %, Co: 50 at %), and having a coercive force Hc of 2400 Oe, Brδ of 100 G$\mu$m and linear recording density of 150 kFCI, the dependence of noise as a recording/reproducing characteristic of the medium on the film thickness of its Cr base layer was observed, and the result is shown in the graph of FIG. 27. It will be understood from FIG. 27 that where the film thickness of the Cr base layer is 1000 Å or smaller, the recording medium shows an excellent noise characteristic ($\leq 3 \mu V$), which is lower than the level of noise of a comparative example having a CoCrTa magnetic layer and no seed layer 7. Since the recording medium can achieve a desired magnetic characteristic due to the provision of the seed layer 7, the film thickness of the base layer 3 can be reduced, which leads to reduction in the noise of the resulting medium. Although actual recording/reproducing characteristics of the recording medium of the present embodiment cannot be confirmed since currently available magnetic heads are not able to satisfactorily perform recording on a medium having a coercive force of 2500 Oe or higher, the superiority or advantage of the recording medium of the present invention, even where the medium has a high linear recording density of 200 kFCI or greater, can be easily gathered from the result of the experiments conducted on the present embodiment.

According to the present invention, a particular seed layer is provided between the substrate and base layer of the magnetic recording medium, to improve the crystal orientation of the base layer, and also improve the crystal orientation of the Co magnetic layer that is epitaxially grown on the base layer, thereby to achieve a high coercive force (Hc$\geq$3000 Oe).

Where the substrate is formed of a glass material, the temperature of the substrate is controlled to be within a range of 150° to 300° C. while the seed layer, base layer, magnetic layer and protective layer are formed by sputtering on the substrate, and the bias voltage of –300 to 0 V is applied to the substrate while the base layer and magnetic layer are formed by sputtering, with the film thickness of the seed layer controlled to within a range of 50 Å to 1000 Å. In this manner, gases, such as moisture, that are absorbed and kept in the substrate are removed due to heating of the substrate, so that the crystal orientation of the base layer and that of the magnetic layer epitaxially grown on the base layer are improved, whereby a considerably high coercive force can be achieved.

With the coercive force thus increased, the thickness of the base layer can be reduced to be in a range of 50 Å to 1000 Å. By reducing the thickness of the base layer, the Co magnetic layer formed on the base layer may be formed of fine or minute particles, with a result of reduction in a magnetization transition region (width of magnetic wall) between recording bits, thereby assuring reduce noise as well as high coercive force.

What is claimed is:

1. A magnetic recording medium comprising:

a substrate;

a base layer made of one of Cr and an alloy containing Cr, said base layer being laminated on said substrate;

a magnetic layer made of an alloy containing Co and laminated on said base layer; and a seed layer provided between said substrate and said base layer, wherein said seed layer is made of a material selected from the group consisting of $Al_{1-x}$—$Co_x$ in which $0.45 \leq x \leq 0.65$, $Cu_{1-x}$—$Si_x$ in which $0.10 \leq x \leq 0.20$, $Ni_{1-x}$—$Ga_x$ in which $0.35 \leq x \leq 0.60$, $Cu_{1-x}$—$Be_x$ in which $0.30 \leq x \leq 0.60$, $Mn_{1-x}$—$V_x$ in which $0.01 \leq x \leq 0.10$, $Ni_{1-x}$—$Zn_x$ in which $0.40 \leq x \leq 0.60$, and $Fe_{1-x}$—$V_x$ in which $0.45 \leq x \leq 0.55$.

2. A magnetic recording medium according to claim 1, wherein said magnetic layer is made of a magnetic material having one of CoNiCrTa system, CoCrPt system, and CoCrTaPt system.

3. A magnetic recording medium according to claim 1, wherein said base layer is made of a Cr alloy containing one of Mo, Ta, Ti and W.

4. A magnetic recording medium according to claim 1, wherein said substrate has concentric grooves formed by texturing in a surface thereof.

5. A magnetic recording medium according to claim 1, wherein one of said substrate, said seed layer and said base layer has minute protrusions and recesses formed on a surface thereof by irradiating said surface with a laser beam.

6. A magnetic recording medium according to claim 1, wherein an uneven layer with minute protrusions and recesses is formed between said substrate and said seed layer, or between said seed layer and said base layer.

7. A magnetic recording medium according to claim 6, wherein said uneven layer with minute protrusions and recesses is made of an oxide or a nitride containing at least one element selected from the group consisting of Al, Cr, Ti, Ta, Zr, Bi and Si.

8. A magnetic recording medium according to claim 1, wherein said substrate comprises an an Al-alloy layer plated with Ni and P.

9. A magnetic recording medium according to claim 1, wherein said substrate is formed of a glass material.

10. A magnetic recording medium according to claim 1, wherein said seed layer has a film thickness in a range of 50 Å to 1000 Å.

11. A magnetic recording medium according to claim 1, wherein said base layer has a film thickness in a range of 50 Å to 1000 Å.

12. A method of manufacturing a magnetic recording medium as claimed in claim 9 having a substrate made of a glass material, a base layer made of Cr or a Cr alloy, a magnetic layer made of a Co alloy, and a seed layer provided between said substrate and said base layer, said method comprising the step of forming said base layer and said magnetic layer by sputtering on said substrate while controlling a temperature of the substrate to be in a range of 150° to 300° C., and applying a bias voltage of –300 to 0 V to the substrate.

13. A magnetic recording medium comprising:

a substrate;

a base layer made of one of Cr and an alloy containing Cr, said base layer being laminated on said substrate;

a magnetic layer made of an alloy containing Co and laminated on said base layer;

a seed layer provided between said substrate and said base layer made of a material selected from the group consisting of $Al_{1-x}$—$Co_x$ in which $0.45 \leq x \leq 0.65$, $Cu_{1-x}$—$Si_x$ in which $0.10 \leq x \leq 0.20$, $Ni_{1-x}$—$Ga_x$ in which $0.35 \leq x \leq 0.60$, $Cu_{1-x}$—$Be_x$ in which $0.30 \leq x \leq 0.60$, $Mn_{1-x}$—$V_x$ in which $0.01 \leq x \leq 0.10$, $Ni_{1-x}$—$Zn_x$ in which $0.40 \leq x \leq 0.60$, and $Fe_{1-x}$—$V_x$ in which $0.45 \leq x \leq 0.55$; and an uneven layer with minute protrusions and recesses between seed layer and said base layer.

* * * * *